Patented Aug. 2, 1927.

1,637,512

UNITED STATES PATENT OFFICE.

LEO H. BAEKELAND, OF YONKERS, NEW YORK, ASSIGNOR TO BAKELITE CORPORATION, OF NEW YORK, N. Y., A CORPORATION OF DELAWARE.

RESINOUS CONDENSATION PRODUCT FROM DIHYDROXYDIPHENYLETHANE AND REACTIVE METHYLENE BODIES AND PROCESS OF MAKING SAME.

No Drawing. Application filed June 30, 1922. Serial No. 572,082.

This invention relates to a novel process whereby resinous phenolic condensation products similar to or identical with certain known substances of this type are simply and economically prepared from dihydroxydiphenylethane, $CH_3CH(C_6H_4OH)_2$, also called p-diphenylolethane or ethylidenediphenol 1, 1. (Compare Beilstein, Handbuch der Organischen Chemie, Vol. II, 1896, page 994.)

As is now well understood, phenolic condensation products of the resinous type may be directly prepared by reaction between phenols and formaldehyde or equivalent bodies having a mobile methylene group. Similar bodies are also prepared by reaction involving phenols and acetaldehyde, for example by the method described in the copending U. S. application of Baekeland and Gotthelf, Serial No. 346,104, filed December 19, 1919. According to the present invention such resinous phenolic condensation products are prepared directly by condensation of dihydroxydiphenylethane with a relatively small proportion of paraform, hexamethylenetetramine, or equivalent substance having a reactive or mobile methylene group. Dihydroxydiphenylethane may be simply prepared in the form of crystals, for example by reacting on acetaldehyde with phenol in presence of hydrochloric acid, and allowing the mixture to stand in the cold until the crystallization is complete; and the present process presents the important advantage that the principal raw materials, phenol and acetaldehyde, are both readily prepared by synthetic methods from raw materials of which the supplies are practically unlimited. It possesses also the advantage that the dihydroxydiphenylethane is easily prepared in relatively pure state and at a comparatively low cost. The fact that the process does not involve the direct or indirect use in large proportions of formaldehyde or acetone, substances of which the available supply and the market price have been subject to wide fluctuations in the past, is a commercial consideration of the highest importance. Furthermore, the process permits a more direct control of the reaction, which approaches more closely the conditions of theoretical simplicity; and the possibility of forming undesirable by-products which may either complicate the manufacturing process or introduce objectionable substances into the final product, is decidedly diminished.

I have found that by reacting upon dihydroxydiphenylethane with paraform, hexamethylenetetramine or their equivalents, all of which bodies are herein referred to collectively as "hardening agents" I am able to prepare resinous or resinoid bodies similar in appearance and in general properties to those obtained heretofore by the action of phenol, cresols or other phenolic bodies on formaldehyde, paraform or hexamethylenetetramine. They are adaptable to the numerous technical uses which have been found for this class of product, now widely known as phenolic condensation products, synthetic resins, or under various manufacturers' trade names.

According to the method of preparation as well as the proportions of the reacting substances, I obtain resinous or resinoid bodies varying widely in their characteristics and properties, such as fusibility, solubility, and general resistant quality toward chemical or physical influences, ranging from the fusible resins or so-called shellac substitutes on the one hand, through intermediate grades, to the type of infusible or insoluble resinoid bodies of great mechanical strength and resistance on the other hand.

These products in their various forms, and either before or after the completion of the reaction, may be incorporated with fibrous materials or other suitable fillers, or with solid solvents or plasticizing agents of any kind; or they may while in the soluble "potentially reactive" state be employed in the manufacture of varnishes, lacquers, cements or solutions of any kind. They may be employed in the potentially reactive state for the impregnation of porous materials, either organic or inorganic; or used in the manufacture of impregnated papers or fabrics, cardboards, laminated products and the like, by absorbing them in or interposing them between layers of paper, felt or woven fabric, and then subjecting the product to heat or heat and pressure to complete the reaction in the manner now well understood in this art. They may likewise be employed for the preparation of molding mixtures, and for numerous other purposes which will suggest themselves to those skilled in the art of utilizing phenolic condensation products.

Following are certain illustrative examples in accordance with my invention, it being understood that the invention is not limited to the particular proportions or manipulations therein set forth:

*Example I.*

100 parts of weight of dihydroxydiphenylethane are heated with ten parts of paraform, first at about 180° C. and later at about 200° C. until a transparent, fusible resinous mass is obtained, which solidifies on cooling to a brittle resin, usually of a light brown color and soluble in acetone and some other organic solvents. The general properties of this substance are similar to those of the material heretofore designated Novolak. (See Baekeland, Journal of Industrial and Engineering Chemistry, Vol. I, No. 8, Aug. 1909). In case a higher degree of fusibility or solubility is desired in the resin the proportion of paraform may be somewhat reduced.

*Example II.*

100 parts by weight of the resin prepared according to Example I are mixed with approximately 10 parts of paraform and subjected to further heating until a hard, infusible mass results. This heating is preferably carried out under external pressure to insure homogeneity in the mass; and as is now well understood in this art, the heating is generally applied simultaneously with the shaping of the article (molded article, laminated plate, etc.) in a hydraulic press having steam-heated platens, the heating being continued until the transformation of the shaped article into the hard and infusible state has been accomplished. If the heating be carried out in a closed vessel, under pressure and without admixture of filler with the resin, the latter appears as a transparent or translucent, hard mass, insoluble or incompletely soluble in acetone.

*Example III.*

The process is carried out as in Example II except that about 12 parts of hexamethylenetetramine are substituted for the 10 parts of paraform used for the transformation of the soluble and fusible resin. The resulting product is essentially similar to that of Example II, but exhibits a somewhat increased tendency to swell and disintegrate in acetone without completely dissolving therein.

*Example IV.*

By increasing the proportions of paraform and hexamethylenetetramine specified in Examples II and III to about 20 parts, a harder and stronger infusible resinoid body is obtained.

*Example V.*

Dihydroxydiphenylethane is heated with paraform or hexamethylenetetramine under conditions substantially as described in the preceding examples, but with such increased proportions of the methylene-containing hardening agent as to produce directly the infusible body which, according to Examples II, III, and IV, is prepared in a two-stage operation. This effect may be obtained by the use of 20 parts or upward of paraform, and corresponding proportions of hexamethylenetetramine.

While in the foregoing examples I have referred to dihydroxydiphenylethane, it is to be understood that my invention contemplates the partial substitution for this body of other phenolic bodies, with modifying effects upon the hardness, color, plasticity, solublity and general resistant qualities of the product. In the several cases the proportions of the reacting bodies may be varied as desired to secure graded technical effects. The paraform and hexamethylenetetramine may be used in admixture with each other, or replaced, wholly or in part by other bodies containing reactive methylene groups and capable of producing similar or equivalent technical effects; or by other suitable aldehyde amines or hardening agents.

I claim:

1. Process of preparing a resinuous condensation product comprising reacting with a hardening agent upon dihydroxydiphenylethane until a resinous condensation product is formed.

2. Process of preparing a resinuous condensation product comprising reacting with a body containing a mobile methylene group upon dihydroxydiphenylethane until a resinous condensation product is formed.

3. Process of preparing an infusible condensation product comprising reacting with a body containing a mobile methylene group upon dihydroxydiphenylethane, the reagents proportioned to yield a fusible resin; and transforming said resin into an infusible body by reacting thereon with a further portion of a methylene-containing agent.

4. The hereindescribed resin-like reaction product of dihydroxydiphenylethane and a body containing a mobile methylene group.

5. A new composition of matter comprising a resinous condensation product of dihydroxydiphenylethane and a hardening agent.

6. A potentially reactive composition, comprising a resinous reaction product of dihydroxydiphenylethane, and a hardening agent therefor.

7. A potentially reactive composition comprising a resinous reaction product of dihydroxydiphenylethane, and hexamethylenetetramine.

In testimony whereof, I affix my signature.

LEO H. BAEKELAND.